United States Patent [19]

Kemmerly et al.

[11] 3,794,774

[45] Feb. 26, 1974

[54] TELEPHONE AUDIO PROGRAM SYSTEM

[75] Inventors: Richard C. Kemmerly; Gary M. Kaner; Gary C. Merritt, all of Dallas, Tex.

[73] Assignee: Courtesy Communications Corporation, Dallas, Tex.

[22] Filed: Jan. 19, 1973

[21] Appl. No.: 325,082

[52] U.S. Cl. .................................. 179/81 R, 179/99
[51] Int. Cl. ............................................ H04m 1/21
[58] Field of Search ................ 179/99, 81 R, 84 VF

[56] References Cited

UNITED STATES PATENTS 3,246,082 4/1966 Levy .................................. 179/1 B

*Primary Examiner*—Kathleen H. Claffy
*Assistant Examiner*—Joseph A. Popek
*Attorney, Agent, or Firm*—D. Carl Richards et al.

[57] ABSTRACT

The specification discloses a system for selectively applying an audio program to incoming telephone lines placed in hold conditions. The system is connected to the exterior cord of a conventional telephone set having a hold switch and a plurality of line switches operable between two positions to open and close the telephone lines. The line switches also have a plurality of illumination modes representative of different operational modes. The system includes a first electronic switch operable to be energized in response to the illumination mode of one of the lines which is representative of a line in use or which is representative of a line placed in the hold condition. A second electronic switch is operable to be energized in response to the placing of the line switch in the up position indicative that the incoming telephone line is open. A relay is operable only when the first and second electronic switches are energized in order to apply an audio program to the incoming telephone line associated with the line switch. The person making the incoming telephone call is thus provided with an audio program such as music or the like during the time the incoming line is placed on hold.

19 Claims, 1 Drawing Figure

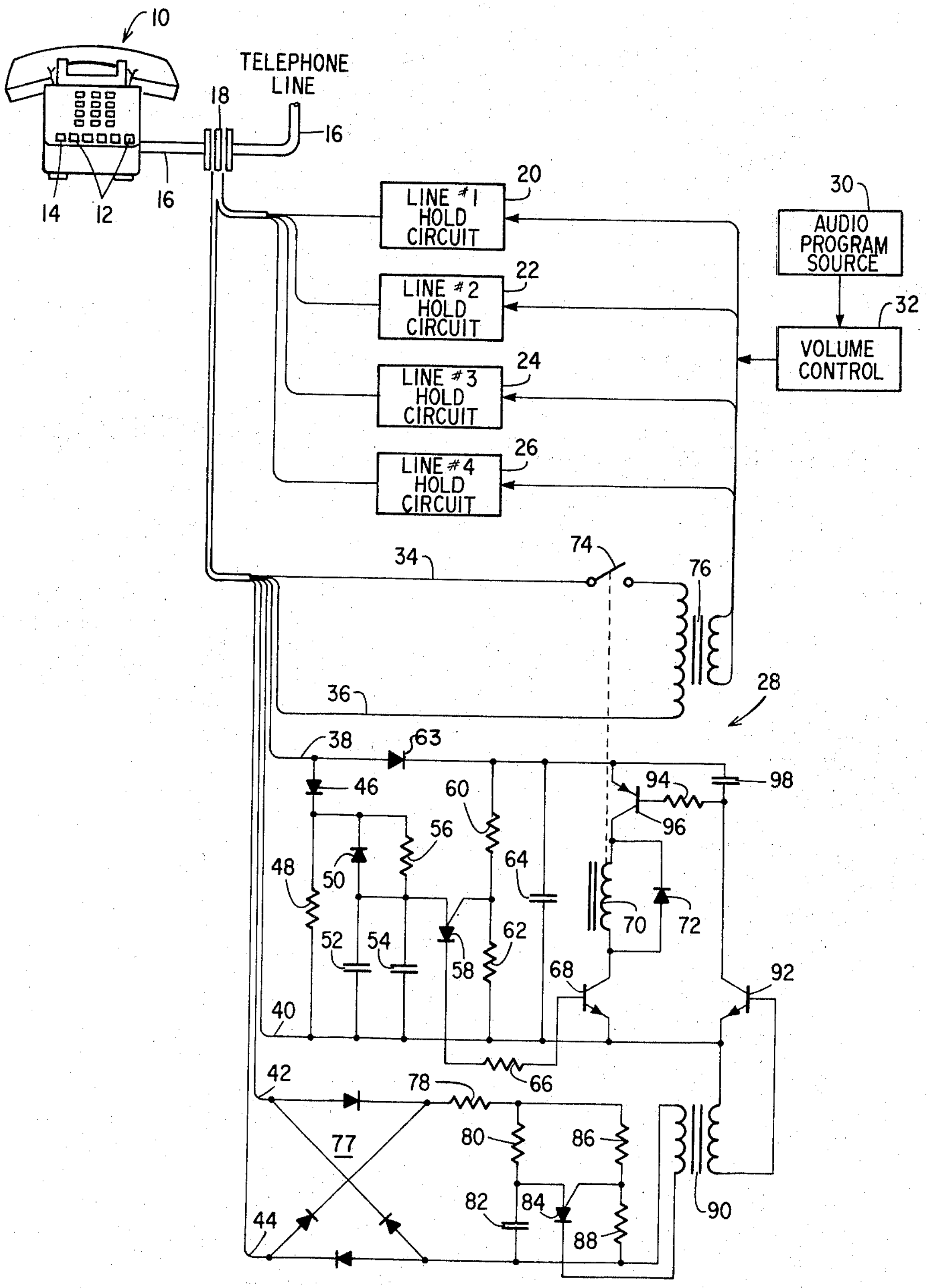
TELEPHONE LINE
LINE #1 HOLD CIRCUIT
LINE #2 HOLD CIRCUIT
LINE #3 HOLD CIRCUIT
LINE #4 HOLD CIRCUIT
AUDIO PROGRAM SOURCE
VOLUME CONTROL

TELEPHONE AUDIO PROGRAM SYSTEM

FIELD OF THE INVENTION

This invention relates to systems for use with conventional telephones, and more particularly, relates to a system for applying an audio program to an incoming telephone call which has been placed on hold.

THE PRIOR ART

Conventional telephone systems having more than one incoming trunk line or more than one extension set include a hold key or button which may be depressed to shunt an incoming call to a holding circuit instead of to one of the local telephone sets. When the desired telephone set is available, the incoming call may be disconnected from the holding circuit and transferred to the desired set to complete the call. During the time that the incoming line is placed in a hold condition, the incoming caller hears no sound. In order to prevent annoyance and frustration of the caller, it has thus been heretofore proposed to apply an audio program to the incalling line during the time it is placed in a hold condition. Such a system is described in U. S. Pat. No. 3,246,082, issued Apr. 12, 1966.

However, such systems as exemplified by U. S. Pat. No. 3,246,082 have not proved to be practical and have not come into widespread use, due to the fact that such prior systems have required interconnection to the holding circuit within the telephone set. Such prior systems have thus required a substantial amount of time and expense in installation and have required the approval and cooperation of the telephone company in order to provide such installations. A need has thus arisen for an inexpensive system for providing an audio program to an incoming call placed on hold which does not require a direct connection of the system to the interior telephone circuits.

SUMMARY OF THE INVENTION

In accordance with the present invention, a system is provided which may be easily connected into the exterior cord leading to a telephone set or switchboard and which automatically places an audio program upon any incoming call which is placed on hold. The present system senses voltages appearing in the exterior cord of the telephone and thus does not require direct interconnection into the hold circuit of the telephone system.

In accordance with a more specific aspect of the invention, a system is provided for applying an audio program to incoming telephone lines connected to a telephone set having line switches each operable between two positions to open and close the line and each also having a plurality of illumination modes representative of different operational states. The system includes circuitry for generating a first signal upon the detection of the illumination modes of a line switch which is representative of a line in use or of a line placed in a hold condition. Circuitry also generates a second signal upon the detection of the position of a line switch when a line is open. Circuitry is responsive to the first and second signals for generating a control signal. A relay is operable by the control signal for applying an audio program to the line placed in a hold condition.

In accordance with another aspect of the invention, a system is provided for applying an audio program on an incoming telephone line connected to a telephone set having at least one visually illuminated line switch for indicating various operational conditions. Circuitry detects the flashing condition of the switch which indicates that the incoming telephone line is in a hold condition and also detects the continuous illuminated condition of the switch which is indicative that the incoming telephone line is closed and is being used. Circuitry also detects the up position of the switch which is indicative that the incoming telephone line is open. Circuitry is operable upon concurrent detection by both the circuits for applying an audio program to the incoming telephone line.

In accordance with another specific aspect of the invention, a system is disclosed for applying an audio program to incoming telephone lines connected to a telephone set having a plurality of line switches operable between two positions in order to open and close the telephone lines and having a plurality of illumination modes representative of different operational modes. The system includes a first unijunction transistor connected to the exterior cord of the telephone set and operable to be switched on in response to the illumination modes of one of the line switches representative of a line in use or representative of a line placed in the hold condition. A second unijunction transistor is connected to the exterior cord and is operable to be switched on in response to the placing of one of the line switches in the up position. A relay is operable only when the first and second unijunction transistors are switched on in order to apply an audio program to the incoming telephone line associated with one of the line switches.

DESCRIPTION OF THE DRAWING

For a more complete understanding of the present invention and for further objects and advantages thereof, reference may now be made to the following description taken in conjunction with the accompanying drawing which illustrates the preferred embodiment of the present system for placing an audio program on an incoming telephone line.

DESCRIPTION OF THE PREFERRED EMBODIMENT

Referring to the drawing, a telephone set 10 is of the conventional type having five line buttons 12 and a hold button 14. An external cord 16 extends from the set 10 to the central station in the well known manner. Although the telephone set 10 has been illustrated, it will be understood that the present invention could be utilized with a local switchboard or the like. As is known, incoming telephone calls to the set 10 are directed through the telephone cord 16, and the line switch 12 corresponding with the desired trunk line or extension is illuminated by a first flashing signal to indicate that a party is ringing in. When the handset of the telephone set 10 is picked up, the line switch is continuously illuminated to indicate that the line is in use. If it is desired to place the incoming call on hold, the button 14 is depressed and the incoming line is connected to a hold circuit. At this time, the corresponding line switch is illuminated by a second flashing signal to indicate that the line is on hold. After the call has been completed and the handset hung up, the line switch is no longer illuminated to indicate that the line is not being used.

The first flashing signal indicating that a party is ringing into a line is a 50 percent on and 50 percent off flashing signal. The second flashing signal indicating that the line is connected to a hold circuit is generally a 90 percent on and 10 percent off flashing signal. These flashing signals are generated by alternating electrical signals applied through wires in the telephone cord 16 which illuminate lamp within the desired line switch according to the above-described illumination modes.

The present system is interconnected within the telephone cord 16 exterior of the telephone set 10 by means of a standard jack 18 connected directly into conventional connectors on the cord. Contacts in the jack interconnect various portions of the circuitry of the invention with the wires bearing electrical signals which illuminate the line switches 12, wires which are connected to the various line switches 12 to provide an indication of whether the switches are in the up or down position, and wires carrying the incoming telephone call. As will be subsequently described, the present circuitry detects the electrical signals present in the wires leading to the line switches 12 and the lamps which illuminate them in order to determine when an incoming telephone lines is placed in a hold condition.

As shown in the drawing, the present system comprises a line hold circuit for each of the five line switches 12. Thus, line hold circuits 20 – 26 are identical to the fifth line hold circuit 28 which is illustrated in schematic detail, except that each of the line hold circuits is connected to wires leading to a different line switch.

An audio program source 30 is connected through a volume control 32 to each of the line hold circuits 20 – 28. On sensing that a particular incoming call is placed in a hold condition, the audio program source provides audio signals which are applied through the particular line hold circuit to the incoming telephone line. The caller is then provided with an audio program during the time that he is in a hold condition. This audio program may comprise music or any desired commercial program. The audio program source 30 may comprise AM or FM radio, a recording device, a live program or the like.

The line hold circuit 28 is illustrated in schematic detail. Leads 34 and 36 are connected through the jack 18 to the wires associated with a particular one of the line switches 12. Leads 38 and 40 are connected through the jack 18 to the wires providing alternating electrical current to illuminate the lamp within the particular line switch. Leads 42 and 44 are connected to the wires leading to the line switches 12 to provide an indication as to whether the line switch is in an up position indicating that the line is open or in a down position indicating that the line is closed.

A diode 46 is connected in series with a resistor 48 across leads 38 and 40. The voltage for illuminating the lamp in the line switch is utilized as the power for the present system. This power is sufficient, as only a few milliampers of current are required by the present invention. The cathode of a diode 50 is connected between the diode 46 and resistor 48, and the anode of the diode 50 is connected to a capacitor 52. A capacitor 54 is connected in parallel with capacitor 52. A resistor 56 is connected across diode 50. The capacitors 52 and 54 are connected across a programmed unijunction transistor 58. Transistor 58 is utilized as an SCR in this configuration and comprises, for example, a 2N6027 programmed unijunction transistor. The values of the capacitances 52 and 54 are chosen in conjunction with the voltage divider resistors such that the unijunction transistor 58 is effectively biased at about 60 percent of the input voltage. The unijunction transistor 58 will not trigger until the capacitors 52 and 54 store approximately 85 percent of the input voltage. The predetermined charge of 85 percent of the input voltage is built up across capacitors 52 and 54 only when the line switch 12 is illuminated by a steady on signal or by the 90 percent on — 10 percent off flashing signal.

The unijunction transistor 58 is connected between a voltage divider network including resistors 60 and 62. A diode 63 is connected in lead 38 and a capacitor 64 is connected across the voltage divider network. Diode 63 and capacitor 64 build up the DC voltage level to provide power to operate the unijunction 58 and the relay to be described. A terminal of the unijunction transistor 58 is connected through a resistor 66 to the base of a transistor 68. When the unijunction transistor 58 is latched on, the transistor 68 is activated. The collector of transistor 68 is connected to one terminal of a relay coil 70 which has a diode 72 connected thereacross. Energization of the coil 70 causes a normally open relay contact 74 to be closed. A transformer 76 applies the audio signal from the source 30 to the leads 34 and 36 when the relay contact 74 is closed, to thereby apply the audio program to the incoming telephone line. Since the incoming line is connected to a hold circuit, the incoming caller will hear the audio program. Transformer 76 isolates the program source from the remainder of the circuit.

Leads 42 and 44 are connected to a 4-diode polarity guard system 77 in order to accommodate different types of voltages of various phone systems. A high value resistor 78 is connected to the rectifier bridge to provide high input impedance to the circuit. A resistor 80 and a capacitor 82 are connected across the polarity guard network 77, with a terminal of a second unijunction transistor 84 being connected to the junction therebetween. Transistor 84 also may comprise, for example, a 2N6027 transistor. A voltage divider network comprising resistors 86 and 88 are also connected across to bias the transistor 84. The output terminal of the transistor 84 is connected to one terminal of an isolation transformer 90. The transistor 84 and its associated circuitry provide a high impedance oscillator which generates oscillations through the transformer 90 when the corresponding line switch 12 is placed in the up position to indicate that the line is open. The oscillations from the oscillator are applied through the transformer 90 to the base of a transistor 92.

The collector of transistor 92 is connected through resistor 94 to the base of a transistor 96. A capacitor 98 is connected across the resistor 94 and the emitter of the transistor 96. A capacitor 98 holds the transistor 96 on between oscillator pulses. Energization of transistor 92 causes energization of transistor 96. When transistors 68 and 96 are concurrently activated, the relay coil 70 is energized in order to close the relay contact 74 to provide an audio program to the desired incoming line. The interconnection of the transistors 68 and 96 with the relay coil 70 act as an AND gate, such that the coil 70 is only energized when the two desired signals are detected. The isolation transformer 90 isolates DC current between the light circuitry and the switch circuitry to enable proper operation.

The operation of the present circuitry will thus be apparent from the foregoing. The present circuit detects via leads 38 and 40 electrical signals which energize the lamp in the corresponding line switch 12 to provide either steady on illumination or 90 percent on — 10 percent off flashing signals. The circuit also detects via leads 42 and 44 electrical signals indicative of the positioning of the corresponding line switch 12 in the up position. Inasmuch as the line switch 12 is up only when the line is open, concurrent detection of the above conditions is present only when an incoming call is placed in a hold condition. Upon the occurrence of such concurrent detection, the unijunction transistors 58 and 84 are energized to thereby energize transistors 68 and 96 to activate relay 70 and close relay contact 74. When the line switch 12 is pushed to the down position such that the incoming call is no longer in a hold condition, or alternatively when the line switch 12 is no longer illuminated indicating that the line is not in use, the relay coil 70 will be de-energized and the switch 70 will be open such that the audio program is no longer applied to the incoming line.

An important aspect of the present invention is that the present circuit rejects the 50–50 percent ringing light flash condition and detects only the 90 percent on — 10 percent off condition. In addition, the present system isolates the telephone line and the audio program source from the detection circuitry, by the use of transformers 76 and 90 and relay 70. Thus, the performance of the telephone system is not affected by the use of the present device.

The present invention also encompasses a circuit for detecting only the 90 percent on — 10 percent off flashing illumination mode of a line switch in order to operate a relay to connect the audio program source to the incoming line. However, the preferred embodiment has been found to provide simpler circuit design and improved operation over such a system. For example, detection of the position of the line switch insures rapid turnoff of the audio program when one of the line switches 12 is depressed. If detection of the flashing mode alone is utilized, a slight delay in turnoff of the audio program might occur due to the requirement of discharging source capacitors.

It will thus be seen that the present invention provides an audio program to an incoming caller placed on hold. The incoming caller may thus listen to a source of program material such as music or the like and is not required to listen to the silent line. Provision of an audio program prevents an incoming caller from becoming disturbed or exasperated while awaiting connection to a desired party. The present system does not require direct interconnection to a telephone set, but may be easily connected through a standard jack to the exterior cord of the telephone set or to a switchboard. The detection circuitry of the invention is of high impedance so as not to affect operation of the phone system. The present detection system may operate over a relatively wide range of voltages.

While the present system has been described with five line hold circuits, it will be understood that only one or more line hold circuits could be utilized so that an audio program is only directed to a selected one of the incoming lines.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An audio program system for use with a telephone having a holding switch for disconnecting a telephone receiver from an incoming line and for connecting the incoming line to a holding circuit comprising:

means connected to the telephone line exterior of said telephone for sensing electrical conditions indicative of the connection of the incoming line to a holding circuit, and means responsive to said sensing means for connecting a source of an audio program to said incoming line.

2. The audio program system of claim 1 wherein said electrical conditions comprise:

electrical signals indicative of a 90 percent on flashing signal and electrical signals indicative of whether the incoming line is open or closed.

3. The audio program system of claim 1 wherein said source of an audio program comprises a radio receiver.

4. A system for applying an audio program on an incoming telephone line connected to a telephone set having flashing line switches for indicating a hold condition comprising:

means for detecting an electrical condition of one of said line switches indicating a flashing mode when said incoming telephone line is placed in a hold condition, and means responsive to said detecting means for applying an audio program to said incoming telephone line.

5. The system of claim 4 wherein said detecting means further detects the position of said switch when said incoming telephone line is open.

6. The system of claim 4 and further comprising:

a source of an audio program, and relay means operable in response to said detecting means for connecting the audio program to said incoming telephone line.

7. The system of claim 4 wherein said system is interconnected in the exterior cord of said telephone set, and wherein said system derives its power from said exterior cord.

8. In a system for applying an audio program to incoming telephone lines connected to a telephone set having line switches each operable between two positions to open and close the lines and each having a plurality of illumination modes representative of different operational states, the combination comprising:

means for generating a first signal upon the detection of an electrical condition of a line switch representative of said line in use or of a line placed in a hold condition, means for generating a second signal upon the detection of the position of a line switch when a corresponding line is open, means responsive to said first and second signals for generating a control signal, and means operable by said control signal for applying an audio program to the line placed in a hold condition.

9. The combination of claim 8 wherein said means for generating said first signal detects the voltage applied to illuminate said line switch.

10. The combination of claim 9 wherein said means for generating comprises:

a capacitor for storing said voltages, and a unijunction transistor connected to said capacitor and operable in response to a predetermined voltage across said capacitor.

11. The combination of claim 8 wherein said means for generating said second signal comprises a unijunction transistor connected to generate said second signal when said line switch is in the up position.

12. In a system for applying an audio program on an incoming telephone line connected to a telephone set having at least one visually illuminated line switch for indicating various operational conditions, the combination comprising:

means for detecting an electrical condition of said switch indicative that said incoming telephone line is in a hold condition and for detecting the continuously illuminated condition of said switch indicative that said incoming telephone line is closed and is being used, means for detecting the up position of said switch indicative that said incoming telephone line is open, and means operable upon concurrent detection by both said means for applying an audio program to said incoming telephone line.

13. The combination of Claim 12 wherein said means for detecting comprise:

semiconductor switches connected to receive voltages from the exterior cord to said telephone set.

14. The combination of Claim 13 and further comprising:

relay means connected to said incoming telephone line and operable only when each of said semiconductor switches are energized, and a source of an audio program connected to said relay means.

15. In a system for applying an audio program to incoming telephone lines connected to a telephone set having a plurality of line switches operable between two positions to open and close the telephone lines and having a plurality of illumination modes representative of different operational modes, the combination comprising:

a first electronic switch connected to the exterior cord of said telephone set and operable to be switched on in response to the illumination modes of one of said line switches representative of a line in use or representative of a line placed in the hold condition, a second electronic switch connected to said exterior cord and operable to be switched on in response to the placing of said one of said line switches in the up position, and relay means operable only when said first and second electronic switches are switched on to apply an audio program to the incoming telephone line associated with said one of said line switches.

16. The combination of Claim 15 wherein said first and second electronic switches comprise unijunction transistors.

17. The combination of Claim 15 and further comprising:

capacitor means connected across said first electronic switch for storing voltage representative of the illumination of said one of said line switches.

18. The combination of Claim 15 and further comprising:

oscillator means including said second electronic switch and operable when said second electronic switch senses the placing of said one of said line switches in the up position.

19. The combination of Claim 15 and further comprising:

an isolation transformer connected between said second electronic switch and said relay means.

* * * * *